United States Patent

Knauer

Patent Number: 6,114,067
Date of Patent: Sep. 5, 2000

[54] CORROSION RESISTANT LEAD ALLOY FOR LEAD-ACID BATTERIES

[75] Inventor: Davis J. Knauer, Kutztown, Pa.

[73] Assignee: East Penn Manufacturing Company, Inc., Lyon Station, Pa.

[21] Appl. No.: 09/058,189

[22] Filed: Apr. 8, 1998

[51] Int. Cl.$^7$ ........................................... H01M 4/68
[52] U.S. Cl. ............................... 429/245; 429/225
[58] Field of Search ................... 429/225, 233, 429/245, 226

[56] References Cited

U.S. PATENT DOCUMENTS

| | | | |
|---|---|---|---|
| 4,376,093 | 3/1983 | Prengaman | 420/573 |
| 5,462,109 | 10/1995 | Vincze et al. | 164/479 |
| 5,834,141 | 11/1998 | Anderson et al. | 429/245 |

OTHER PUBLICATIONS

Nagata, Abstract of JP 54 046124, "Lead alloy grids for lead–acid battery", Apr. 1979.

Fouache et al. J. Power Sources, vol. 78, Issue 1–2. pp. 12–22, Mar. 1999.

Albert et al., J. Power Sources, vol. 67, Issue 1–2, pp. 257–265, Jul. 1997.

Batgshaw, J. Power Sources, vol. 53, Issue 1, pp. 25–20, Jan. 1995.

Primary Examiner—Maria Nuzzolillo
Assistant Examiner—Carol Chaney
Attorney, Agent, or Firm—Zachary T. Wobensmith, III

[57] ABSTRACT

Corrosion resistant lead alloy metal for use in the battery grid of a lead acid battery. The alloy includes calcium in an amount greater than 0.06% and also includes copper.

The alloy improves the life of the battery and also aids the manufacturing process by more quickly reaching the required strength for the manufacturing processes.

2 Claims, 1 Drawing Sheet

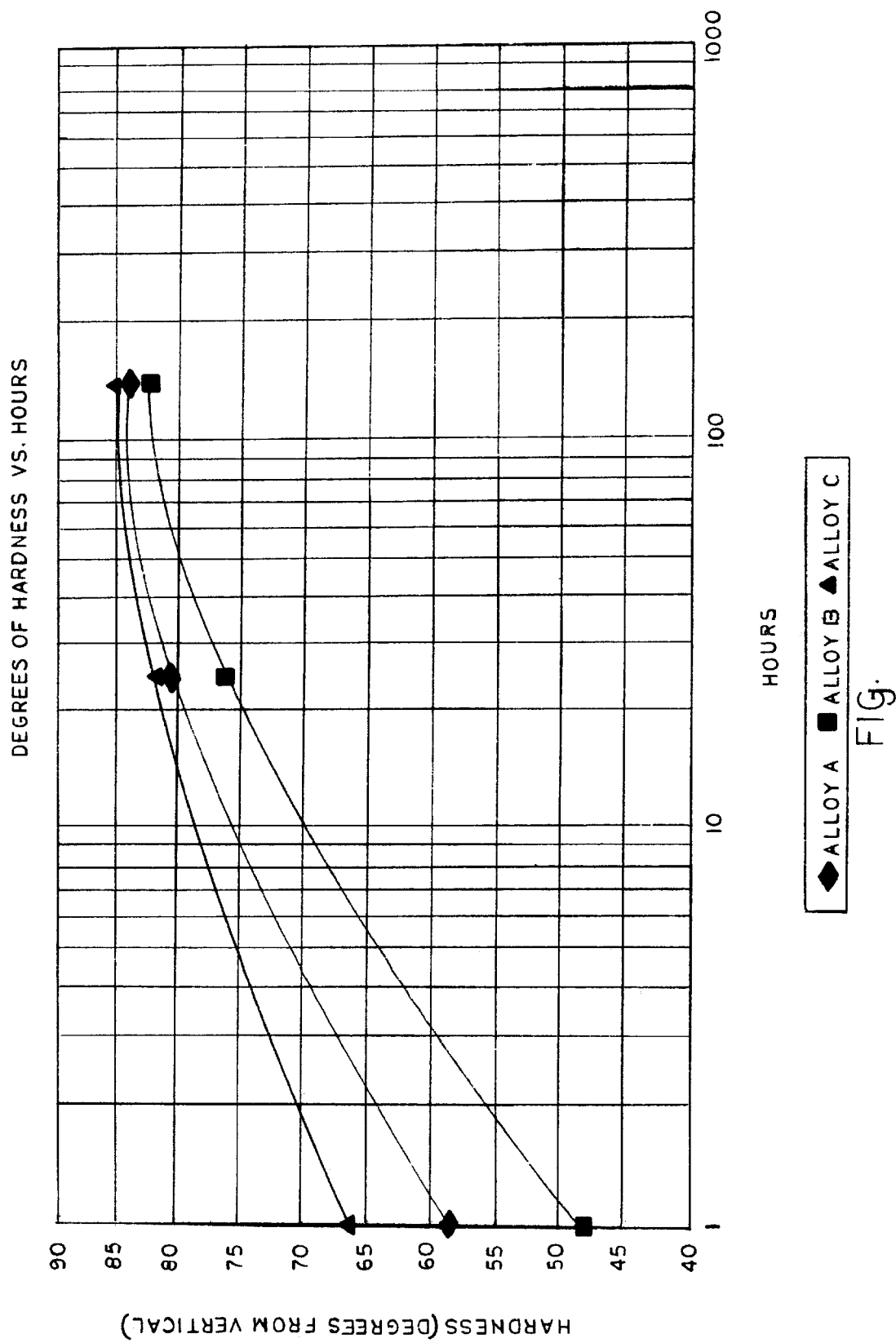

CORROSION RESISTANT LEAD ALLOY FOR LEAD-ACID BATTERIES

The subject matter of this application is shown and described in the disclosure document of Davis J. Knauer No. 417,014 filed on Apr. 9, 1997.

BACKGROUND OF THE INVENTION

1. Field of the Invention

This invention relates to a corrosion resistant lead alloy for grids and plates used in lead-acid batteries.

2. Description of the Prior Art

Various combinations of materials have been proposed as additives to the lead alloys used in the grids and plates of lead-acid batteries.

The prior art lead alloys as exemplified in U.S. Pat. Nos. 5,298,350 and 5,434,025 describe the use of calcium as an additive for lead alloys, but limit its amount to a maximum of 0.06% by weight.

The lower the level of calcium the longer it takes for the alloy to become stiff enough for the manufacturing process.

Other prior art patents call for the use of calcium in a percentage weight range of 0.06 to 0.1%, with tin in the percentage weight range of 0.1 to 0.8% for maintenance free batteries.

There has also been interest in using low antimony lead based alloys, which contain antimony of about 1 to 2.5%, and the use of calcium-aluminum as additives in lead alloys.

Experiments were conducted using calcium as an additive in lead alloys in the weight range of 0.06 to 0.08, tin in the weight range of 0.3 to 0.6, silver in the weight range of 0.01 to 0.05, and copper in the weight range of 0.01 to 0.05 which alloys attain the required strength for the manufacturing processes quickly, and improve the life of the battery over the prior art alloys.

SUMMARY OF THE INVENTION

This invention relates to a lead alloy for use in the battery grids and plates of lead-acid batteries which includes calcium, tin, silver and copper in specified percentages by weight.

The principal object of the invention is to provide a lead alloy which obtains working strength quickly, and is corrosion resistant.

A further object of the invention is to provide a lead alloy which is useful in a wide variety of different designs of lead acid batteries.

A further object of the invention is to provide a lead alloy where the calcium content is above 0.06% and below 0.09%, and the copper content is in the weight range of 0.01 to 0.05%.

A further object of the invention is to provide a lead alloy which is easier to manufacture and handle.

A further object of the invention is to provide a lead alloy which provides an improved product life cycle.

Other objects and advantageous features of the invention will be apparent from the description and claims.

DESCRIPTION OF THE DRAWINGS

The nature and characteristic features of the invention will be more readily understood from the following description taken in connection with the accompanying drawing, forming part hereof in which:

The FIGURE is a graph of three lead alloy compositions, plotting the degree of hardness versus time in hours.

It should of course be understood that the description and drawings herein are merely illustrative and that various modifications and changes can be made in the structure disclosed without departing from the spirit of the invention.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Pursuant to the invention and referring to the FIGURE lead alloys for use in forming battery plates or grids contain calcium in the range of 0.06% to 0.08%, by weight, tin at 0.3% to 0.6% by weight, silver in the range of 0.01% to 0.05% by weight and copper in the range of 0.01% to 0.05% by weight. The preferred amounts by weight are calcium at 0.08%, tin at 0.5%, silver at 0.03% and copper at 0.045%.

Lead alloys were selected for test with an alloy formulated in accordance with U.S. Pat. No. 5,434,025 as alloy (B) having calcium at 0.04%, tin at 0.5% and silver at 0.015% by weight, an alloy (A) with calcium at 0.08%, tin at 0.5%, silver at 0.03% and copper at 0.045%, and an alloy (C) with calcium at 10%, and tin at 0.3%.

The alloys were mixed in the production lead pot of a grid casting machine and the machine was cycled to cast the grids.

The grids were tested to determine hardness by measuring the deflection of the grid at various times, as shown in the following table.

Age Hardening of Grids

Deflection Angle (Degrees from Vertical) vs. Age from Casting

| Age from Casting | Alloy A | Alloy B | Alloy C |
|---|---|---|---|
| 1 Hour | 58° | 48° | 66° |
| 1 Day | 81° | 77° | 82° |
| 6 Days | 84° | 83° | 85° |

(Note: no deflection, i.e., maximum strength, would have an angle of 90°)

The grids were cast using book molds and mounted onto the edge of a table by clamping one inch of the end of the panel onto the edge of the table. The angle of deflection from horizontal was measured at various times. The grid design and weight was uniform for all variables. As the grids were allowed to age, the deflection angle decreased indicating that the grids got stiffer with time. The initial strength of the grids is very important since the production of battery plates depends on having strong grids as soon as possible. Grids made from alloys A and C became harder sooner than those made from alloy B, as is illustrated by reference to the FIGURE.

The bare grids were also tested by constructing test cells using one positive and one negative grid, separated with polyethylene separator material. The cells also contained 1.290 specific gravity sulfuric acid, and were put on charge for 72 hours, at 3 volts (constant potential), at a temperature of 160° F. The final grid weight was compared to the initial weight and the difference was expressed as a percentage of the initial weight.

|  | Alloy A | Alloy B | Alloy C |
| --- | --- | --- | --- |
| Initial Grid Weight, G | 56.7 | 58.1 | 56.4 |
| After 50 Hours | 53.7 | 54.7 | 52.3 |
| Percent Weight loss | 5.3% | 5.9% | 7.3% |

The bare corrosion rate of alloy B was less than alloy A. However, grids made with alloy B do not develop sufficient strength fast enough for optimum use in manufacturing, therefore alloy B was not further investigated.

Plate corrosion studies were conducted for Alloy A and Alloy C by constructing test cells using one positive plate between two negative plates, separated with polyethylene enveloping material. The cells also contained 1.290 specific gravity sulfuric acid, and were put on a cycle test for 2,000 cycles at a temperature of 160° F. All plates were pasted from the same paste mix (i.e., formulation), and to the same paste weight per plate. The cells were discharged at the rate of three amps for four minutes, VPC>1.75. The cells were charged at 2.47 VPC until 140% of ampere hours were returned. The final grid weight was compared to the initial weight and the difference was expressed as a percentage of the initial weight. The capacity of the plates was also compared after 2,000 cycles, and are shown in the following table:

| Plate Corrosion Studies | | |
| --- | --- | --- |
|  | Alloy A | Alloy C |
| Initial Grid Weight, G | 62.8 | 62 |
| After 2,000 Cycles | 53.5 | 52.5 |
| Percent Weight Loss | 14.8% | 15.3% |
| Plate Capacity, Ah | 4.6 | 3.7 |

These results indicated that lead alloys with a calcium content above 0.08% did not improve the percentage weight loss of the grid, nor the capacity of the plates.

Batteries were constructed using lead alloys A and C for group 34/78 lead-acid batteries, with plates 4.25 inches high and 5.625 inches wide.

The life cycles of the batteries were determined using the following test procedure.

1. With the battery in a water bath maintained at 100° F., charge the battery for 110 hours at a rate of 4.5 amps.
2. Allow the battery to stand with no charging for 50 hours.
3. Discharge the battery at 150 amps for 30 seconds, recording the voltage at seconds. The minimum requirement is 1.2 volts per cell.
4. The number of weeks that the battery survived is computed to the last week in which the minimum discharge time of 30 seconds was met. The week in which the battery failed to meet the discharge requirement was not included in reporting life cycle weeks.

The results of the test were as follows:

|  | Alloy A | Alloy C |
| --- | --- | --- |
| Positive Grid Alloy | A | C |
| Plates Per Cell | 15 | 15 |
| Separator Type | Polyethylene Envelope | Polyethylene Envelope |
| Separator Thickness, in. | .042 | .042 |
| Sep. Back-Web Thickness, in. | .008 | .008 |
| Cold Cranking Amps | 720 | 720 |
| Reserve Capacity, minute | 118 | 118 |
| Battery Weight, pounds | 38.5 | 38.6 |
| Life Cycles, weeks | 19 | 10 |

The test results illustrate that alloy A was superior to alloy C in both weight loss and life cycle and that alloy A was superior to alloy B in developing its strength much more quickly than alloys below 0.06% calcium and without copper and therefore alloy A is more valuable in the manufacturing processes.

Accordingly, it will thus be seen that corrosion resistant lead alloys for lead-acid batteries have been provided with which the objects of the invention are attained.

What is claimed is:

1. A Lead Alloy for the Plate or Grid of a Lead-acid Battery which Alloy consists essentially of about 0.06–0.08 wt % calcium; about 0.3–0.6 wt % tin; about 0.01–0.04 wt % silver; about 0.01–0.04 wt % copper with the balance lead.

2. An Automotive lead-acid battery having a container with a plurality of cells and an electrolyte contained in the cells, each cell having a plurality of positive and negative grids, said positive grid consisting essentially of about 0.06–0.08 wt % calcium; about 0.3–0.6 wt % tin; about 0.01–0.04 wt % silver; about 0.01–0.04 wt % copper with the balance lead.

* * * * *